(12) United States Patent
Ouchi

(10) Patent No.: US 9,700,833 B2
(45) Date of Patent: Jul. 11, 2017

(54) COMPLEX FOR ACID GAS SEPARATION, MODULE FOR ACID GAS SEPARATION, AND METHOD FOR MANUFACTURING MODULE FOR ACID GAS SEPARATION

(71) Applicant: FUJIFILM Corporation, Tokyo (JP)

(72) Inventor: Ryo Ouchi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 162 days.

(21) Appl. No.: 14/819,492

(22) Filed: Aug. 6, 2015

(65) Prior Publication Data

US 2015/0336056 A1 Nov. 26, 2015

Related U.S. Application Data

(63) Continuation of application No. PCT/JP2014/000075, filed on Jan. 10, 2014.

(30) Foreign Application Priority Data

Feb. 22, 2013 (JP) .................................. 2013-033464

(51) Int. Cl.
*B01D 53/22* (2006.01)
*B01D 69/12* (2006.01)
(Continued)

(52) U.S. Cl.
CPC ........... *B01D 53/22* (2013.01); *B01D 53/228* (2013.01); *B01D 63/10* (2013.01); *B01D 65/003* (2013.01);
(Continued)

(58) Field of Classification Search
CPC ...... B01D 63/10; B01D 71/46; B01D 65/003; B01D 71/38; B01D 71/40; B01D 69/125;
(Continued)

(56) References Cited

U.S. PATENT DOCUMENTS 4,464,494 A * 8/1984 King ..................... B01D 63/10
156/330
4,780,204 A * 10/1988 Rasmussen ........... B01D 29/15
210/314
(Continued)

FOREIGN PATENT DOCUMENTS

EP 2239048 A1 10/2010
JP 59-73008 A 4/1984
(Continued)

OTHER PUBLICATIONS

Communication dated Dec. 1, 2015, from the Japanese Patent Office in counterpart application No. 2013-033464.
(Continued)

*Primary Examiner* — Anthony Shumate
(74) *Attorney, Agent, or Firm* — Sughrue Mion, PLLC

(57) ABSTRACT

A complex for acid gas separation includes an acid gas separation membrane, a permeated gas flow path member, and a sealing portion. The acid gas separation membrane includes a porous support with pores having an average pore diameter of 0.5 μm or less, and an acid gas separation layer disposed on the porous support. The permeated gas flow path member allows acid gas, which has permeated through the acid gas separation layer, to pass therethrough. The sealing portion seals a region required to be sealed with resin, the region being on the periphery of the permeated gas flow path member and the porous support. The sealing portion is made of epoxy resin, the Tg of epoxy resin is 90° C. or higher and the content of an inorganic filling material is less than or equal to 30% by mass.

7 Claims, 5 Drawing Sheets

(51) Int. Cl.
- *B01D 67/00* (2006.01)
- *B01D 71/46* (2006.01)
- *B01D 63/10* (2006.01)
- *C08L 63/00* (2006.01)
- *B01D 69/14* (2006.01)
- *B01D 65/00* (2006.01)
- *B01D 69/10* (2006.01)
- B01D 71/36 (2006.01)
- B01D 71/38 (2006.01)
- B01D 71/40 (2006.01)
- B01D 71/60 (2006.01)

(52) U.S. Cl.
CPC ......... *B01D 67/0088* (2013.01); *B01D 69/10* (2013.01); *B01D 69/12* (2013.01); *B01D 69/125* (2013.01); *B01D 69/142* (2013.01); *B01D 71/46* (2013.01); *C08L 63/00* (2013.01); *B01D 71/36* (2013.01); *B01D 71/38* (2013.01); *B01D 71/40* (2013.01); *B01D 71/60* (2013.01); *B01D 2257/2045* (2013.01); *B01D 2257/304* (2013.01); *B01D 2257/308* (2013.01); *B01D 2257/404* (2013.01); *B01D 2257/504* (2013.01); *B01D 2323/30* (2013.01); *B01D 2325/12* (2013.01); *B01D 2325/20* (2013.01); *B01D 2325/28* (2013.01); *Y02C 10/10* (2013.01)

(58) Field of Classification Search
CPC .. B01D 71/36; B01D 71/60; B01D 2257/404; B01D 53/22; B01D 69/142; B01D 53/228; B01D 69/10; B01D 2257/2045; B01D 69/12; B01D 2257/308; B01D 2257/304; B01D 67/0088; C08L 63/00
See application file for complete search history.

(56) References Cited

U.S. PATENT DOCUMENTS

| | | | | |
|---|---|---|---|---|
| 4,792,397 A * | 12/1988 | Rasmussen | .......... | B01D 29/072 210/314 |
| 4,808,378 A * | 2/1989 | Nakanishi | ............ | B01D 63/043 128/DIG. 3 |
| 5,034,126 A | 7/1991 | Reddy et al. | | |
| 5,275,726 A * | 1/1994 | Feimer | .................. | B01D 63/10 210/321.74 |
| 5,458,943 A * | 10/1995 | Taylor | ................. | E06B 3/66319 428/34 |
| 6,565,747 B1 | 5/2003 | Shintani et al. | | |
| 9,186,628 B2 * | 11/2015 | Fautsch | ............... | B01D 63/021 |
| 9,333,458 B2 * | 5/2016 | Cao | ........................ | B01D 63/022 |
| 2007/0023290 A1 * | 2/2007 | Hawkins | .............. | B01D 61/445 204/520 |
| 2009/0246429 A1 * | 10/2009 | Zaki | ........................ | C08K 3/08 428/35.8 |
| 2011/0036237 A1 | 2/2011 | Okada et al. | | |
| 2012/0031831 A1 | 2/2012 | Kanougi et al. | | |
| 2012/0219718 A1 | 8/2012 | Okada et al. | | |
| 2012/0297976 A1 | 11/2012 | Sano | | |
| 2013/0026090 A1 * | 1/2013 | Johnson | ................. | B01D 63/10 210/435 |
| 2013/0098830 A1 * | 4/2013 | Muraki | ................ | B01D 63/103 210/457 |
| 2013/0146514 A1 * | 6/2013 | Reeves | ................ | B01D 61/022 210/106 |
| 2013/0160650 A1 | 6/2013 | Okada et al. | | |
| 2013/0334124 A1 * | 12/2013 | Konishi | ............... | B01D 63/106 210/321.83 |
| 2014/0137740 A1 | 5/2014 | Aburaya et al. | | |
| 2015/0182917 A1 * | 7/2015 | Hosoya | ................ | B01D 63/106 422/617 |

FOREIGN PATENT DOCUMENTS

| | | | |
|---|---|---|---|
| JP | 5-131123 A | 5/1993 | |
| JP | 6170176 A | 6/1994 | |
| JP | 2000-354742 A | 12/2000 | |
| JP | 2007167806 A | 7/2007 | |
| JP | 2013-27850 A | 2/2013 | |
| JP | EP 2737938 A1 * | 6/2014 | ............. B01D 53/22 |
| WO | 2010/114010 A1 | 10/2010 | |
| WO | 2013/018538 A1 | 2/2013 | |

OTHER PUBLICATIONS

Communication dated Apr. 5, 2016, issued by the State Intellectual Property Office of the P.R.C. in corresponding Chinese Application No. 201480009489.7.
Communication dated Apr. 5, 2016, issued by the European Patent Office in corresponding European Application No. 14754557.8.
International Search Report for PCT/JP2014/000075 dated Apr. 15, 2014.

\* cited by examiner

COMPLEX FOR ACID GAS SEPARATION, MODULE FOR ACID GAS SEPARATION, AND METHOD FOR MANUFACTURING MODULE FOR ACID GAS SEPARATION

CROSS-REFERENCE TO RELATED APPLICATIONS

This application is a Continuation of PCT International Application No. PCT/JP2014/000075 filed on Jan. 10, 2014, which claims priority under 35 U.S.C. §119(a) to Japanese Patent Application No. 2013-033464 filed on Feb. 22, 2013. Each of the above application(s) is hereby expressly incorporated by reference, in its entirety, into the present application.

BACKGROUND

The present disclosure relates to a complex for acid gas separation, a module for acid gas separation, and a method for manufacturing the module for acid gas separation.

Various types of membrane modules, such as spiral membrane modules, flat membrane modules, hollow fiber membrane modules, and the like, have been conventionally used to concentrate raw fluid such as liquid or gas, separate specific components from the raw fluid, or the like. For example, Patent Document 1 (Japanese Unexamined Patent Publication No. 2000-354742) discloses a spiral membrane module in which a separation membrane, a feed channel member, and a permeable channel member are wound around the center tube.

Such a spiral membrane module is typically manufactured by spirally winding one or a plurality of separation membrane units around a center tube and trimming (end face modification process) both ends of the resultant cylindrical wound body. In such a case, each separation membrane unit is produced such that members, each having a feed channel member disposed between two-folded separation membrane portions, and permeable channel members are alternately laminated, and an adhesive agent is applied to the peripheral portions of the separation membrane (three sides) to prevent feed fluid and permeable fluid from being mixed. The adhesive agent above is extremely significant from the viewpoints of preventing the feed fluid and the permeable fluid from being mixed and improving separation performance. Urethane isocyanate adhesive agents have been conventionally used as an adhesive agent (For example, Patent Document 2 (Japanese Unexamined Patent Publication No. 59 (1984)-073008)). Further, Patent Document 1 employs heat and alkali resistant plastics to adapt to treatment with the alkali solution of high temperature and high concentration.

Meanwhile, the development of technology to selectively separate acid gas from raw material gas has been advancing in recent years. For example, acid gas separation modules for separating acid gas from raw material gas by using an acid gas separation membrane that allows acid gas to selectively permeate therethrough have been developed. Such a separation membrane can be roughly classified into so-called accelerated transport membranes containing carriers that transport acid gas to the opposite side of the membrane, and dissolution diffusing membranes that perform separation by utilizing the difference in solubility with respect to the membrane and the difference in diffusivity in the membrane, between acid gas and the substance to be subject to separation.

SUMMARY

In the case that the substance to be subject to separation is gaseous body (gas), gas is much more likely to leak than liquid. Accordingly, it is difficult to suppress gas leaks from adhesive portions with adhesive agents such as those disclosed in Patent Documents 1 and 2 above. In addition, when acid gas is separated from raw material gas having a high temperature of 100° C. or higher and containing water vapor, adhesive portions could be deteriorated due to heat or moisture, thereby degrading the efficiency of separation and considerably deteriorating durability. In such a case, lowering the temperature of the raw material gas in the accelerated transport membrane will degrade reactivity with respect to carriers. Therefore, it is extremely important to secure heat resistance to improve the efficiency of separation.

Further, the separation membrane that employs the accelerated transport membrane includes a porous support for supporting an accelerated transport membrane containing carriers. When a spiral membrane module is used, a spiral membrane module is loaded in a cylindrical pressure container, and a pressure difference is applied between a feed side and a permeable side with a separation membrane interposed therebetween while raw fluid is caused to flow into the pressure container. Thereby, concentration and separation are performed through the separation membrane, resulting in a phenomenon that the accelerated transport membrane is pushed toward the porous support being likely to occur. Accordingly, it is necessary to reduce the pore diameters of the pores within the porous support to prevent the accelerated transport membrane from being pushed toward the porous support. However, if the pore diameters are reduced, an adhesive agent will not penetrate the pores, which could cause gas leaks.

The present disclosure has been developed in view of the foregoing circumstances. The present disclosure provides a complex for acid gas separation that can suppress gas leaks even when employing raw material gas having high temperature and humidity and that has high separation performance and durability; a module for acid gas separation, and method for manufacturing module for acid gas separation; and method for manufacturing module for acid gas separation.

A complex for acid gas separation of the present disclosure comprising:
  an acid gas separation membrane including:
  a porous support with pores having an average pore diameter of 0.5 µm or less; and
  an acid gas separation layer disposed on the porous support, the acid gas separation layer including water-absorbing polymers and acid gas carriers that react with acid gas in a raw material gas;
  a permeated gas flow path member that allows acid gas, which has reacted with the acid gas carriers and has permeated through the acid gas separation layer, to pass therethrough; and
  a sealing portion that seals a region on the periphery of the permeated gas flow path member and the porous support with resin, the region being required to be sealed, wherein
    the resin is made of epoxy resin,
    the Tg of the sealing portion is 90° C. or higher, and
    the content of an inorganic filling material is less than or equal to 30% by mass.

A module for acid gas separation of the present disclosure, comprising:
  an acid gas separation membrane including:

a porous support with pores having an average pore diameter of 0.5 µm or less; and an acid gas separation layer disposed on the porous support, the acid gas separation layer including water-absorbing polymers and acid gas carriers that react with acid gas in a raw material gas;

a permeated gas flow path member that allows acid gas, which has reacted with the acid gas carriers and permeated through the acid gas separation layer, to pass therethrough; and a sealing portion that seals both ends in the width direction and one end in the longitudinal direction of the porous support and the permeated gas flow path member, with resin;

a feed gas flow path member, into which raw material gas containing the acid gas is fed; and a permeated gas collecting pipe having open holes on the wall thereof, wherein the acid gas separation membrane, the permeated gas flow path member, and the feed gas flow path member are wound around the permeated gas collecting pipe, the resin is made of epoxy resin, the Tg of the resin of the sealing portion is 90° C. or higher, and the content of an inorganic filling material is less than or equal to 30% by mass.

A method for manufacturing the module for acid gas separation of the present disclosure, comprising:

forming an acid gas separation membrane including a porous support and an acid gas separation layer support by providing the acid gas separation layer on the porous support, the acid gas separation layer having water-absorbing polymers and acid gas carriers that react with acid gas in raw material gas, forming a sealing portion by causing resin to penetrate both ends in the width direction and one end in the longitudinal direction of the porous support and the permeated gas flow path member that allows acid gas, which has reacted with the acid gas carriers and permeated through the acid gas separation layer, to flow therethrough, and winding the acid gas separation membrane, the permeated gas flow path member, and a feed gas flow path member around a permeated gas collecting pipe, the feed gas flow path member being a member into which raw material gas containing the acid gas is fed and the permeated gas collecting pipe having open holes on the wall thereof, wherein the viscosity of the resin is within a range from 5 to 60 Pa·s, the Tg of the resin after being cured is 90° C. or higher, and the content of an inorganic filling material is less than or equal to 30% by mass.

It is preferable for the resin to be epoxy resin.

The resin may be a two-component mixed resin.

It is preferable for the usable time of the resin to be within a range from 60 to 240 minutes.

The complex for acid gas separation of the present disclosure employs resin to seal a region desired to be sealed with resin, the region being the periphery of an acid gas separation membrane and a permeated gas flow path member. The module for acid gas separation of the present disclosure employs resin to seal both ends in the width direction and one end in the longitudinal direction of a porous support and a permeated gas flow path member. Both resin are made of epoxy resin, having a Tg of 90° C. or higher, and the content of an inorganic filling material is less than or equal to 30% by mass. Accordingly, gas leaks can be suppressed, and high separation performance and durability can be achieved even if a high temperature and highly humid raw material gas is employed.

DESCRIPTION OF THE PREFERRED EMBODIMENTS

Hereinafter, a complex for acid gas separation, a module for acid gas separation, and a method for manufacturing the module for acid gas separation will be described in detail with reference to the attached drawings.

[Complex for Acid Gas Separation]

Figure 1:
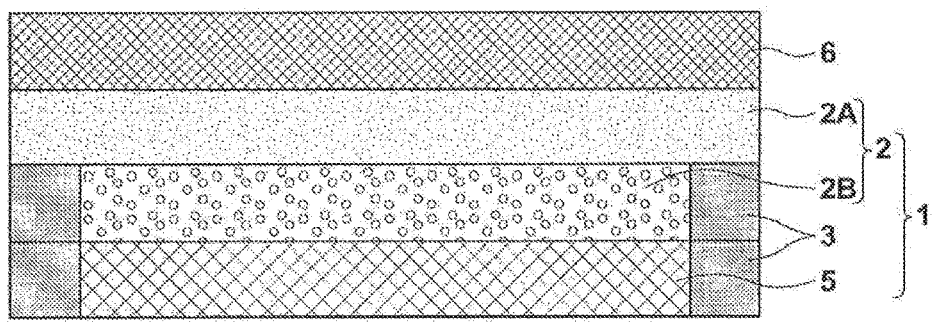
FIG. 1 is a schematic sectional view illustrating one embodiment of a complex for acid gas separation of the present disclosure.

FIG. 1 is a schematic sectional view of a complex for acid gas separation according to one embodiment of the present disclosure. The complex for acid gas separation 1 includes an acid gas separation membrane 2 and a permeated gas flow path member 5, and further includes a sealing portion 3, as illustrated in FIG. 1. The acid gas separation membrane 2 includes a porous support 2B with pores having an average pore diameter of 0.5 µm or less and an acid gas separation layer 2A that is disposed on this porous support 2B and that contains water-absorbing polymers and acid gas carriers which react with acid gas in a raw material gas. The permeated gas flow path member 5 allows acid gas, which has reacted with the acid gas carriers and has permeated through the acid gas separation layer 2A, to pass therethrough. The sealing portion 3 seals a region on the periphery of the permeated gas flow path member 5 and the porous support 2B with resin, the region being required to be sealed (a region desired to be sealed). In addition, FIG. 1 illustrates an aspect in which a feed gas flow path member 6, into which a raw material gas containing acid gas is fed, is provided on the acid gas separation membrane 2. Note that it is possible to not include the feed gas flow path member 6 depending on the configuration of the complex for acid gas separation. Such a configuration in which a feed gas flow path member is provided is not essential for the complex for acid gas separation of the present disclosure. This sealing portion 3 enables the periphery of the permeated gas flow path member 5 and the porous support 2B to be completely sealed, thereby suppressing the acid gas from leaking.

FIG. 1 illustrates an aspect in which the sealing portion 3 is provided at the edge portions of a laminate including the permeated gas flow path member 5 and the porous support 2B that face each other. However, the sealing portion 3 may be provided at a region desired to be sealed, which is on the periphery of the permeated gas flow path member 5 and the porous support 2B. In other words, the sealing portion 3 may be provided at a region excluding a permeated gas extraction region (not shown) which is typically provided in the permeated gas flow path member 5. Further, in the porous support 2B, a portion corresponding to the sealed portion in the permeated gas flow path member may be sealed. For example, in the case that the permeated gas extraction region is provided along the entirety of one side of the permeated gas flow path member 5, the remaining three sides will be sealing portions 3. In the case that the permeated gas extraction region is not on the periphery of the permeated gas flow path member 5 but at the lower side of the permeated gas flow path member 5 of FIG. 1, the entirety of the peripheral edge of the permeated gas flow path member 5 will be the sealing portion 3.

The sealing portion 3 is made of epoxy resin. The Tg of the resin of the sealing portion 3 is 90° C. or higher, and the content of an inorganic filling material is less than or equal to 30% by mass. If the Tg of the resin of the sealing portion 3 is 90° C. or higher and the content of an inorganic filling material is less than or equal to 30% by mass, resin other than epoxy resin, e.g., engineering plastics, such as polyester; rubber; elastomer; and the like may be contained within a range of less than or equal to 30% by mass. Sealing with resin having such a Tg can avoid deteriorating sealing portions due to heat or moisture and degrading the efficiency of separation even when acid gas is separated from a raw material gas having a high temperature of 100° C. or higher and containing water vapor. In addition, sealing with resin having such a Tg eliminates the necessity for lowering the temperature of a raw material gas. This can avoid deterioration in the efficiency of separation due to a reduction in the reactivity with respect to the carriers. It is more preferable for the Tg of the resin of the sealing portion 3 to be greater than or equal to 100° C. and less than or equal to 250° C., even more preferably greater than or equal to 120° C. and less than or equal to 200° C.

In the case that concentration and separation of acid gas are performed by applying a pressure difference between the feed gas flow path member 6 and the permeated gas flow path member 5, between which the acid gas separation membrane 2 is disposed, in the complex for acid gas separation 1, it is necessary to set an average pore diameter of the porous support to be 0.5 μm or less to prevent the acid gas separation layer 2A from being pushed toward the porous support 2B. However, when pores have such small pore diameters, the quality of the penetration of resin will deteriorate, resulting in gas leaks from the portion where the quality of the penetration of the resin deteriorates being likely to occur. In the present disclosure, it is preferable for the content of the inorganic filling material of the resin to be less than or equal to 30% by mass. Configuring the content of the inorganic filling material of the resin to be less than or equal to 30% by mass will facilitate the penetration of the resin into the porous support 2B, thereby suppressing the gas leaks. Further, it is more preferable for the content of the inorganic filling material to be less than or equal to 20% by mass, and even more preferably less than or equal to 10% by mass.

Examples of the inorganic filling material may include crystalline silica, amorphous silica, aluminum hydroxide, magnesium hydroxide, calcium carbonate, magnesium carbonate, calcium silicate, magnesium silicate, calcium oxide, magnesium oxide, alumina, aluminum nitride, aluminum borate whiskers, boron nitride, antimony oxide, and the like. Crystalline silica and amorphous silica are preferable from the viewpoint of general versatility and economic efficiency.

The complex for acid gas separation of the present disclosure can be manufactured by the following steps, for example: an acid gas separation layer-forming coating liquid including water-absorbing polymers and acid gas carriers is applied onto the porous support to form a coated membrane. Then, the coated membrane is dried to form an acid gas separation layer, thereby creating an acid gas separation membrane. Thereafter, resin is disposed at portions desired to be sealed on the periphery of the permeated gas flow path member, and the disposed resin is attached to the porous support side of the acid gas separation membrane to form a sealing portion.

Subsequently, the configuration of a module for acid gas separation will be described.

[Module for Acid Gas Separation]

Figure 2:
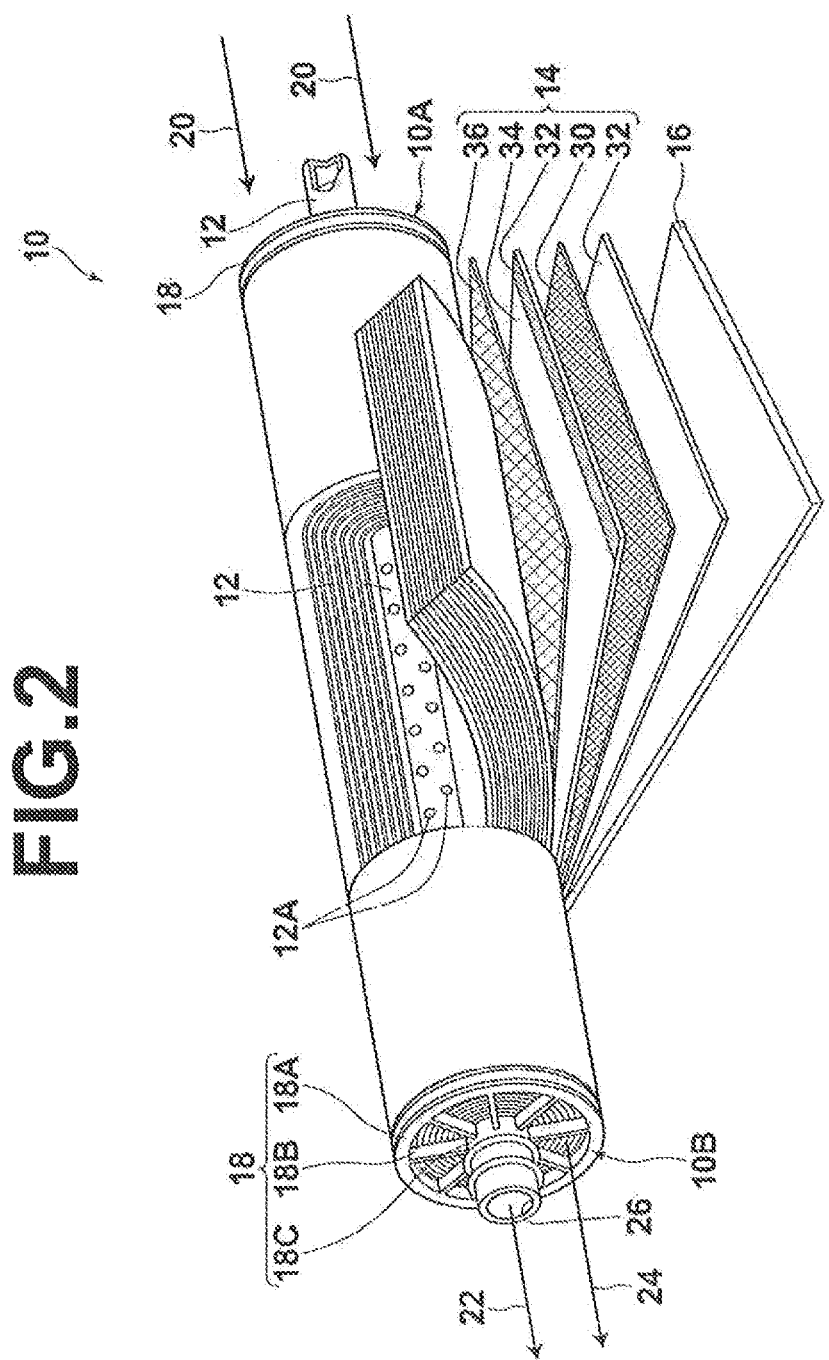
FIG. 2 is a schematic sectional view illustrating one embodiment of a module for acid gas separation of the present disclosure, with a portion thereof being cut out.

FIG. 2 is a schematic sectional view illustrating one embodiment of a module for acid gas separation of the present disclosure, with a portion thereof being cut out. As the basic configuration of a module for acid gas separation 10 as illustrated in FIG. 2, one or plurality of laminated bodies 14 are wound around a permeated gas collecting pipe 12, and the outermost periphery of the laminated body 14 is covered with a covering layer 16, thereby creating a unit. Further, telescope prevention plates 18 are mounted at both ends of the unit. In such an acid gas separation module 10, when a raw material gas 20 containing acid gas is fed into the laminated body 14 from one end 10A thereof, the raw material gas 20 will be separated into acid gas 22 and residual gas 24, thereby being exhausted from the other end 10B separately from each other, in accordance with the configuration of the laminated body 14 to be described below.

The permeated gas collecting pipe 12 is a cylindrical pipe, a pipe wall of which has a plurality of open holes 12A. One end of the pipe (end 10A) of the permeated gas collecting pipe 12 is closed, while the other end of the pipe (end 10B) is open, thus creating an exhaust port 26 to exhaust acid gas 22, such as carbon dioxide, which has permeated through the laminated body 14 and has been collected in the interior of the permeated gas collecting pipe 12 through the open holes 12A.

It is preferable for a ratio (opening ratio) of the area occupied by the opening holes 12A with respect to the surface area of the permeated gas collecting pipe 12 to be within a range from 1.5% to 80%, more preferably from 3% to 75%, and even more preferably from 5% to 70%. In addition, it is preferable for the opening ratio to be within a range from 5% to 25% from the viewpoint of practicability. By setting the values of the lower limit as described above, acid gas 22 can be collected effectively. Further, by setting the values of the upper limit as described above, the strength of the pipe can be enhanced and processing suitability can be sufficiently secured.

The shapes of the open holes 12A are not particularly limited, but it is preferable for circle holes, each having a diameter of 1 to 20 mmϕ to be made. In addition, it is preferable for the open holes 12A to be uniformly disposed over the surface of the permeated gas collecting pipe 12.

The covering layer 16 is made of a blocking material that is capable of blocking a raw material gas 20 passing through the module for acid gas separation 10. It is preferable for this blocking material to have heat resistance and moisture resistance. Here, the term "heat resistance" means having heat resistance of 80° C. or higher. In particular, the heat resistance of 80° C. or higher means that even after a material is stored for two hours under a temperature of 80° C. or higher, the form of material can be maintained as it was before being stored, and no curls caused by heat contraction or heat fusion can be visually identified. In addition, the term "moisture resistance" means that even after a material is stored for two hours at 40° C., 80% RH, the form of the material can be maintained as it was before being stored, and no curls caused by heat contraction or heat fusion can be visually identified.

It is preferable for each telescope prevention plate 18 to have an outer circumferential annular portion 18A, an inner circumferential annular portion 18B, and a radial spoke portion 18C. It is also preferable for these portions to be made from heat and moisture resistant materials.

The laminated body 14 is configured by disposing the feed gas flow path member 30 between the inner sides of the acid gas separation membrane 32 folded in two and adhesively bonding the permeated gas flow path member 36 to the radially inner side of the two-folded acid gas separation membrane 32 to be sealed with the sealing portion 34 permeated into these membrane and member.

The number of the laminated bodies to be wound around the permeated gas collecting pipe 12 is not particularly limited, and one or a plurality of laminated bodies 14 may be available. However, by increasing the number of the laminated bodies, the surface area of the acid gas separation layer 32A can be enlarged, thereby increasing the amount of acid gas 22 which can be separated by one module. Alternatively, the length of the laminated body 14 may be increased to enlarge the surface area of the acid gas separation layer 32A.

When there are a plurality of laminated bodies 14, it is preferable for the number of the laminated bodies 14 to 50 or less, more preferably 45 or less, and even more preferably 40 or less. If the number of the laminated bodies is less than the above-described number, winding the laminated bodies will be facilitated, thereby improving processing suitability.

The width of the laminated body 14 is not particularly limited, but it is preferable for the width to be within a range from 50 mm to 10000 mm, more preferably from 60 mm to 9000 mm, even more preferably from 70 mm to 8000 mm. In addition, it is preferable for the width of the laminated body 14 to be within a range from 200 mm to 2000 mm from the viewpoint of practical use. By setting the values of lower limit as described above, the effective surface area of the acid gas separation layer 32 can be secured even if resin (sealing portion) is applied. In addition, by setting the values of upper limit as described above, a winding core can be held horizontally, thereby suppressing the generation of a winding deviation.

Figure 3:
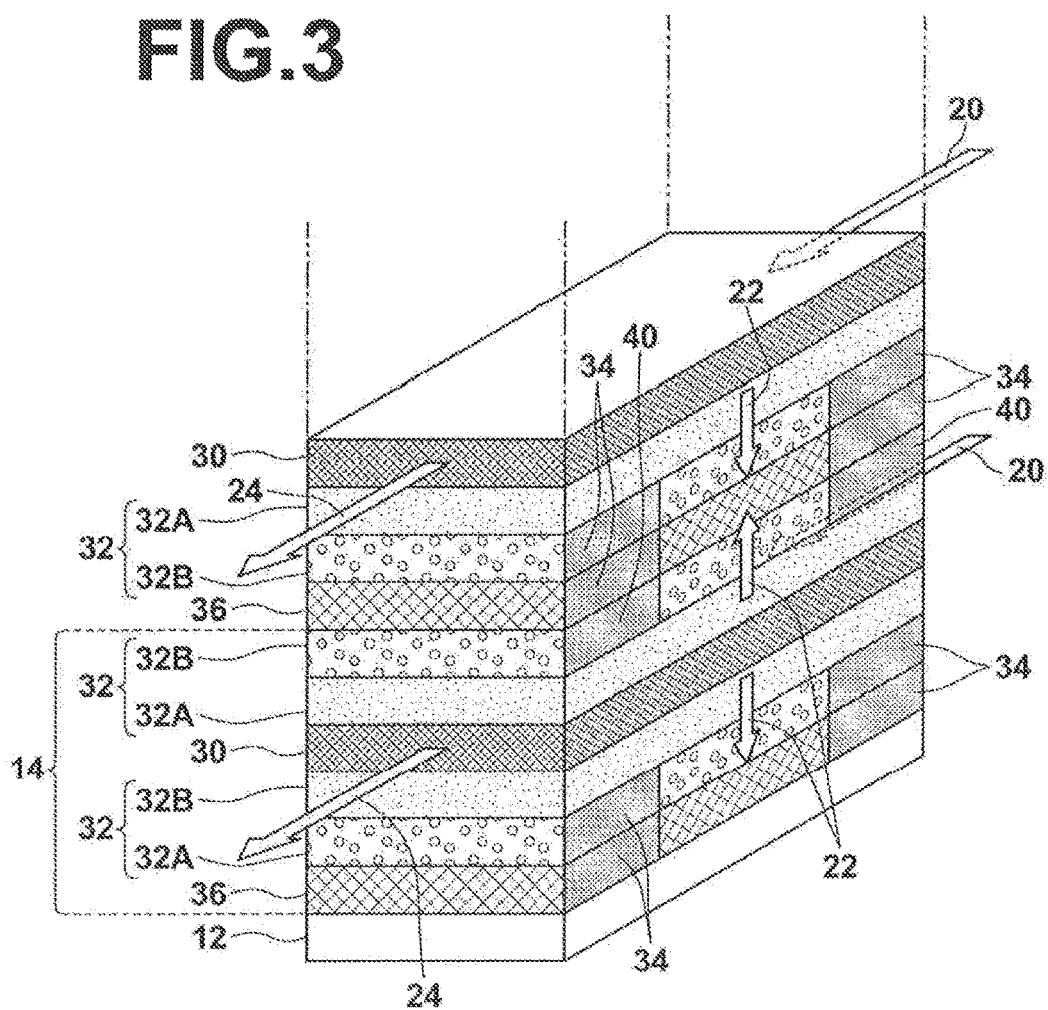
FIG. 3 is a perspective and cross sectional view illustrating a portion of a cylindrical wound body in which a laminated body is wound around a permeated gas collecting pipe.

FIG. 3 is a perspective and cross sectional view illustrating a portion of a cylindrical wound body in which a laminated body is wound around a permeated gas collecting pipe and schematically illustrating the entirety thereof along the width direction of the cylindrical wound body with the center thereof eliminated. As illustrated in FIG. 3, the laminated bodies 14 are adhesively bonded to each other with a sealing portion 40 permeated to the acid gas separation membrane 32, thereby being laminated around the permeated gas collecting pipe 12. In particular, the laminated body 14 is formed by laminating, in the order from the side of the permeated gas collecting pipe 12, the permeated gas flow path member 36, the acid gas separation membrane 32, the feed gas flow path member 30, and the acid gas separation membrane 32. In such a laminate of these members and membranes, raw material gas 20 containing acid gas 22 is fed from the end of the feed gas flow path member 30, and then, the acid gas 22, which has permeated through the acid gas separation membrane 32 segmented by the coating layer 16 and has been separated from the raw material gas 20, is collected in the interior of the permeated gas collecting pipe 12 through the permeated gas flow path member 36 and the open holes 12A. Then, the collected gas is withdrawn from the exhaust port 26 coupled with the permeated gas collecting pipe 12. Further, the residual gas 24 which has permeated through the air gap of the feed gas flow path member 30 and has been separated from the acid gas 22 will be exhausted from the side of the exhaust port 26 on the end of the feed gas flow path member 30 and the acid gas separation membrane 32.

Figure 4:
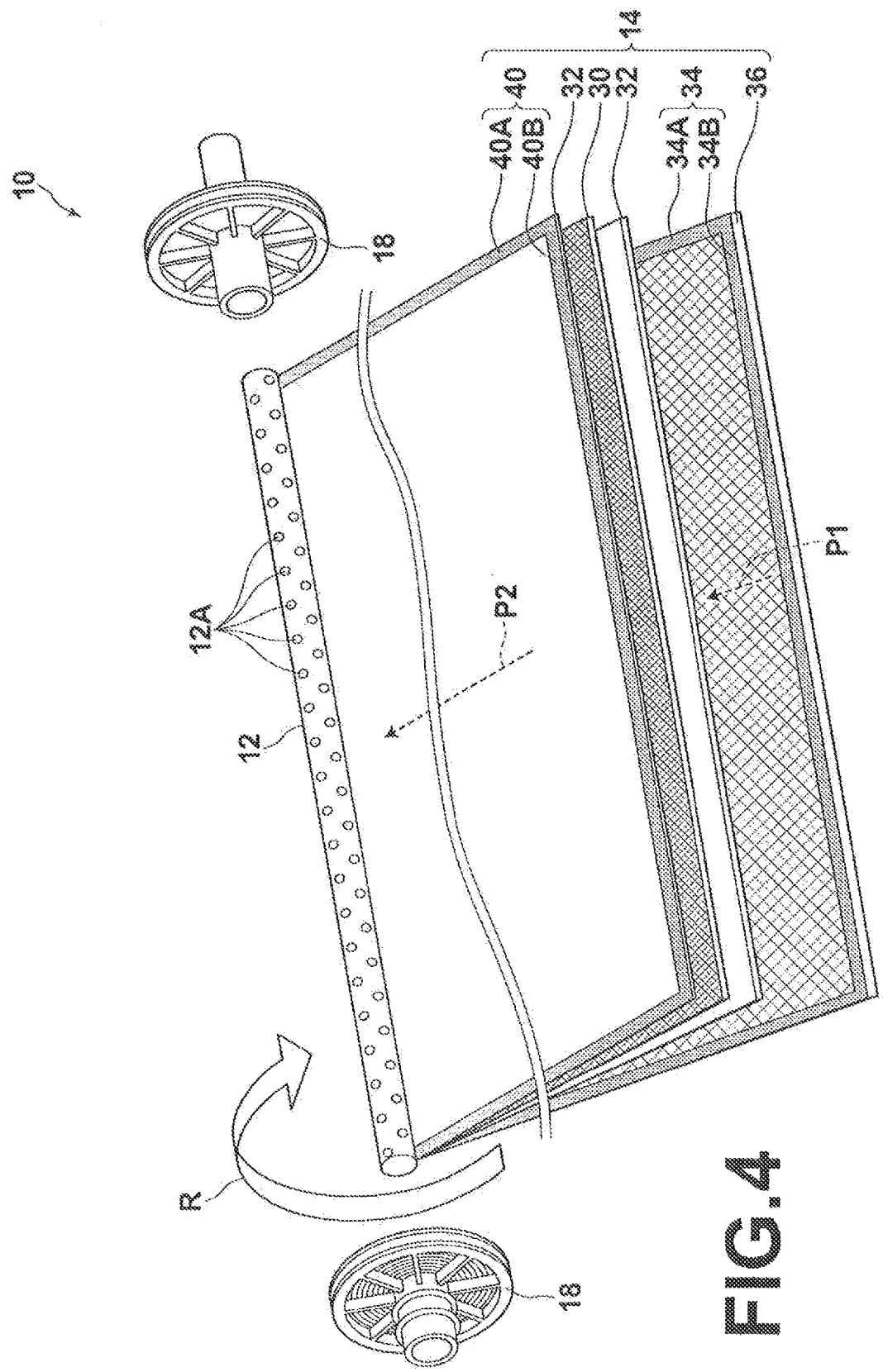
FIG. 4 is a schematic pattern diagram illustrating the laminated body prior to being wound around the permeated gas collecting pipe.

FIG. 4 is a view illustrating the laminated body to be wound around the permeated gas collecting pipe as well as illustrating one embodiment of regions where sealing portions 34 and 40 are formed. As illustrated in FIG. 4, the sealing portion 40 seals the acid gas separation membrane 32 and the permeated gas flow path member 36 by adhesively bonding them to each other, with the open holes 12A being covered with the permeated gas flow path member 36 and the laminated body 14 being wound around the permeated gas collecting pipe 12 in the direction of an arrow R illustrated in the Figure. In contrast, the sealing portion 34 has already sealed the acid gas separation membrane 32 and the permeated gas flow path member 36 by adhesively bonding them to each other before the laminated body 14 is wound around the permeated gas collecting pipe 12.

The sealing portions 34 and 40 respectively include circumferential sealing portions 34A that seal the edges of both sides of the permeated gas flow path member 36 along the circumferential direction of the permeated gas collecting pipe 12 and circumferential sealing portions 40A that seal the edges of both sides of the acid gas separation membrane 32 along the circumferential direction of the permeated gas collecting pipe 12. In addition, the sealing portions 34 and 40 also respectively include an axial sealing portion 34B that seals the circumferential edge of the permeated gas flow path member 36 and an axial sealing portion 40B that seals the circumferential edge of the permeated gas separation membrane 32.

The circumferential sealing portions 34A are connected to the axial sealing portion 34B, thus creating the sealing portion 34 as a whole. The sealing portion 34 as a whole creates the form of an envelope with the circumferential edge between the acid gas separation membrane 32 and the permeated gas flow path member 36 to be wound being open. In addition, a flow path P1, through which the acid gas 22 which has permeated through the acid gas separation membrane 32 flows to the open holes 12A, is formed in a space segmented by the circumferential sealing portions 34A and the axial sealing portion 34B. Similarly, the circumferential sealing portions 40A are connected to the axial sealing portion 40B, thus creating the sealing portion 40 as a whole. The sealing portion 40 as a whole creates the form of an envelope with the circumferential edge between the acid gas separation membrane 32 and the permeated gas flow path member 36 to be wound being open. In addition, a flow path P2, through which the acid gas 22 which has permeated through the acid gas separation membrane 32 flows to the open holes 12A, is formed in a space segmented by the circumferential sealing portions 40A and the axial sealing portion 40B.

In the acid gas separation membrane 32, moisture contained in the membrane oozes to the porous support 32B, thereby increasing the wettability of the porous support 32B and causing resin to be sucked into the porous support 32B with the surface tension of the porous support 32B. As a result, the resin of the sealing portions 34 and 40 will easily penetrate into pores within the porous support 32B through the permeated gas flow path member 36. Accordingly, it is not necessary to form the circumferential sealing portions 34A and 40A by potting resin to increase the adhesive strength of the sealing portions 34 and 40, and a typical application method is sufficient to obtain such an increased adhesive strength thereof. As a result, gas leaks can be suppressed. The resin of the sealing portions in the module for acid gas separation is the same as those of the complex for acid gas separation as described above. Therefore, the descriptions about the resin will be omitted here.

Hereinafter, the configurations of the module for acid gas separation will be described in detail. Note that the detailed configurations of the complex for acid gas separation are the same as those for the module for acid gas separation.

<Acid Gas Separation Layer>

An acid gas separation layer is an accelerated transport member including water-absorbing polymers, acid gas carriers, and water. It is preferable for the acid gas separation layer to have heat and moisture resistance because a raw material gas containing steam is presumed to be caused to flow therethrough at high temperature.

(Water-Absorbing Polymer)

Water-absorbing polymers function as a binder, and when used in an acid gas separation layer, the water-absorbing polymers retain moisture and allow the acid gas carriers to exhibit the function of separation. It is preferable for the water-absorbing polymers to solve in water to form application liquid. Furthermore, it is preferable for the water-absorbing polymers to have high water-absorbing properties, and to absorb water, whose mass is 5 to 1000 times with respect to the mass of the water-absorbing polymers, from the viewpoint that the acid gas separation layer has high water-absorbing properties (moisture retaining properties).

As the water-absorbing polymers, for example, polyvinyl alcohol-polyacrylic acid salt, polyvinyl alcohol-polyacrylic acid (PVA-PAA) copolymers, polyvinyl alcohol, polyacrylic acid, polyacrylic acid salt, polyvinyl butyral, poly-N-vinylpyrrolidone, poly-N-vinylacetamide, and polyacrylamide are suitable from the viewpoint of water-absorbing properties, film forming properties, strength, and the like. Particularly, PVA-PAA copolymers are preferable. PVA-PAA copolymers have high water absorbing ability, and in addition, even at the time of high water absorption, the strength of hydrogel is great. The content ratio of polyacrylic acid salt in the PVA-PAA copolymers is preferably within a range from 5 mol % to 95 mol %, and more preferably from 30 mol % to 70 mol %. Examples of the polyacrylic acid salt include an alkali metal salt such as a sodium salt or a potassium salt, an ammonium salt, an organic ammonium salt, and the like.

Examples of commercially available PVA-PAA copolymers include KURASTMER AP20 (manufactured by Kuraray Co., Ltd.).

(Acid Gas Carrier)

Acid gas carriers contained in an acid gas separation layer may be any substance that has affinity with acid gas and exhibit water solubility, and known substances can be used. In this case, examples of the acid gas carriers include carbon dioxide, hydrogen sulfide, carbonyl sulfide, sulfur oxide ($SO_x$), nitrogen oxide ($NO_x$), hydrogen halide such as hydrogen chloride. Examples of the acid gas carriers include alkali metal carbonates, alkali metal bicarbonates, and alkali metal hydroxides.

Examples of alkali metal carbonates preferably include, for example, lithium carbonate, sodium carbonate, potassium carbonate, rubidium carbonate, and cesium carbonate.

Examples of alkali metal bicarbonates include, for example, lithium hydrogencarbonate, sodium hydrogencarbonate, potassium hydrogencarbonate, rubidium hydrogencarbonate, and cesium hydrogencarbonate.

Examples of alkali metal hydroxides include, for example, cesium hydroxide, rubidium hydroxide, and the like.

Among these, alkali metal carbonates are preferable, and compounds that contain cesium or rubidium are preferable. Further, the carbon dioxide carriers may be used as a mixture of two or more types of them. For example, the mixture of cesium carbonate and potassium carbonate may be suitably used as the acid gas carriers.

The content of the acid gas carriers within the acid gas separation layer is preferably within a range from 0.1% by mass to 30% by mass, more preferably from 0.2% by mass to 20% by mass, and even more preferably from 0.3% by mass to 15% by mass to exhibit the function of the acid gas carriers and obtain excellent separation stability as an acid gas separation layer under a use environment, although the content of the acid gas carriers within the acid gas separation layer depends on the ratio with respect to the content of the water-absorbing polymers and on the types of the acid gas carriers.

The acid gas separation layer may contain components (additives) other than the water-absorbing polymers, the acid gas carriers, and water, within ranges of not adversely affecting the gas separating characteristics. Examples of components to be arbitrarily used include, for example, a gelling agent, a viscosity modifier, a crosslinking agent, an acid gas absorption accelerator, surfactants, catalysts, auxiliary solvents, membrane strength adjusting agents, and defect detecting agents. The gelling agent is for gelling a coated film, i.e., controlling set properties by applying an aqueous solution (application liquid) for forming an acid gas separation layer that contains the water-absorbing polymers and acid gas carriers onto a porous support, and then cooling the application liquid film in a drying process. The viscosity modifier is for modifying the viscosity when applying the application liquid onto a support with a coating applicator. The crosslinking agent is for enhancing the strength of the membrane of the acid gas separation layer. The defect detecting agents is for facilitating the detection of a defect in the formed acid gas separation layer.

It is preferable for the average thickness of the acid gas separation layer to be within a range from 5 µm to 50 µm, more preferably from 10 µm to 40 µm, and specifically preferably from 15 µm to 30 µm, from the viewpoint of obtaining an acid gas separation layer having good performance.

<Porous Support>

A porous support is a support having multiple pores, the average diameter of the pores being 0.5 µm or less. In this case, the average diameter refers to a value calculated by using the bubble point method. In particular, the value is measured by using the Perm Porometer (which conforms to JIS K 2332) produced by the PMI, Inc. as a measuring device and calculated through the following steps: a porous support of 3 cm square is soaked in a surfactant solution (the Galwick solution), and the porous support is taken out of the solution to lightly wipe off an excessive surfactant solution from the porous support. Then, the porous support is set to a measuring cell of the measuring device, with two pieces of metal mesh sandwiching the porous support, and is then gradually pressurized by supplying air thereinto at the ambient temperature of the room (25° C.) to measure the bubble point. When the thickness of the porous support is too thick, the gas permeability will decline. When the thickness of the porous support is too thin, there will be problems with the strength thereof. Accordingly, it is preferable for the thickness of the support to be within a range from 30 µm to 500 µm, more preferably from 50 µm to 450 µm, and even more preferably from 50 µm to 400 µm.

The material for the porous support is not particularly limited, and examples of the material include paper, high quality paper, coated paper, cast coated paper, synthetic paper, and further, resin materials such as cellulose, polyester, polyolefin, polyamide, polyimide, polysulfone, aramid, polycarbonate, and inorganic materials such as metals, glass, and ceramics. More specifically, examples of the resin materials suitably include polyethylene, polystyrene, polyethylene terephthalate, polytetrafluoroethylene (PTFE), polyether sulfone (PES), polyphenyl sulfide (PPS), polysulfone (PSF), polypropylene (PP), polyimide, polyether imide, polyether ether ketone, or polyvinylidene fluoride.

Further, examples of the material that is preferable from the viewpoint of heat and moisture resistant properties include inorganic materials such as ceramics, glass, and metal and organic resin materials having heat resistance of 100° C. or higher. In particular, high molecular weight polyester, polyolefin, heat-resistant polyamide, polyimide, polysulfone, aramid, polycarbonate, metal, glass, and ceramics may be suitably used. More preferably, it is preferable for the material to include at least one selected from the group consisting of ceramics, polytetrafluoroethylene, polyvinylidene fluoride, polyethersulfone, polyphenylene sulfide, polysulfone, polyimide, polypropylene, polyetherimide, and polyetheretherketone.

<Permeated Gas Flow Path Member>

It is preferable for a permeated gas flow path member to function as a spacer, to have a function that causes the permeated acid gas to flow inwardly from the permeated gas flow path member, and to be a net-like member so as to have function that causes resin to permeate therethrough. The same materials for the porous support may be applied for those of the permeated gas flow path member. Further, it is preferable for the permeated gas flow path member to have heat and moisture resistance as well because raw material gas containing steam is presumed to be caused to flow therethrough at high temperature.

In particular, it is more preferable for the material for the permeated gas flow path member to be polyester such as epoxy impregnated polyester, polyolefin such as polypropylene, fluorine such as polytetrafluoroethylene.

The thickness of the permeated gas flow path member is not particularly limited, and it is preferable for the thickness to be within a range from 100 µm to 1000 µm, more preferably from 150 µm to 950 µm, and even more preferably from 200 µm to 900 µm.

Further, it is also preferable for the acid gas flow path member to have lower resistance because the acid gas flow path member is a path for acid gas which has permeated through the acid gas separation layer. In particular, it is preferable for the permeated gas flow path member to have high porosity, be hardly deformable under pressure, and be low in pressure loss. The porosity is preferably within a range from 30% to 95%, more preferably from 35% to 92.5%, and even more preferably from 40% to 90%. Note that the porosity is measured as described below. First, a sufficient amount of water is perfused into void space in the permeated gas flow path member with ultrasonic waves, and the like, and then the excess water on the surface thereof is removed. Then, the mass per unit area is measured. This measured value of the mass is subtracted from the dry mass, thereby obtaining a value which represents the volume of the water within the void of the permeated gas flow path member. Thus, the void volume and therefore the porosity can be measured by being converted into the density of water. In this case, when a sufficient amount of water is not perfused into void space, a solvent having a low surface tension such as alcohol can be used for measurement.

Deformation under pressure can be approximated by the degree of elongation in a tensile test. It is preferable for the degree of elongation when applying a load of 10 N per 10 mm width to be within 5%, and more preferably within 4%.

Further, the pressure loss can be approximated by the loss of fluid of compressed air which is caused to flow at a constant flow rate. It is preferable for the pressure loss to be within 7.5 L/min, and more preferably within 7 L/min when the compressed air is caused to flow through the 15 cm square permeated gas flow path member 36 at 15 L/min at room temperature.

<Feed Gas Flow Path Member>

A feed gas flow path member is a member for receiving a raw material gas containing acid gas. It is preferable for the feed gas flow path member to function as a spacer and to produce turbulent flow in the raw material gas. Accordingly, a net-like member is preferably used as the feed gas flow path member. The flow path of gas changes depending on the shape of a net, and therefore the shape of unit lattice of the net is determined by selecting any of, for example, rhomboid, parallelogram, and the like according to a purpose. The same material as that for the porous support may be applied for the feed gas flow path member. Further, it is preferable for the feed gas flow path member to have heat and moisture resistance as well because a raw material gas containing steam is presumed to be caused to flow therethrough at high temperature.

The thickness of the feed gas flow path member is not particularly limited, and it is preferable for the thickness to be within a range from 100 µm to 1000 µm, more preferably from 150 µm to 950 µm, and even more preferably from 200 µm to 900 µm.

Subsequently, the method for producing the module for acid gas separation will be described.

<Method for Producing Module for Acid Gas Separation>

Figure 5A:
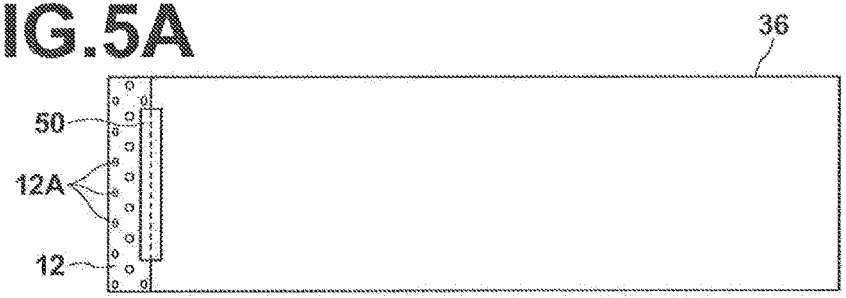
FIG. 5A is a manufacturing process view of the module for acid gas separation.
Figure 5B:
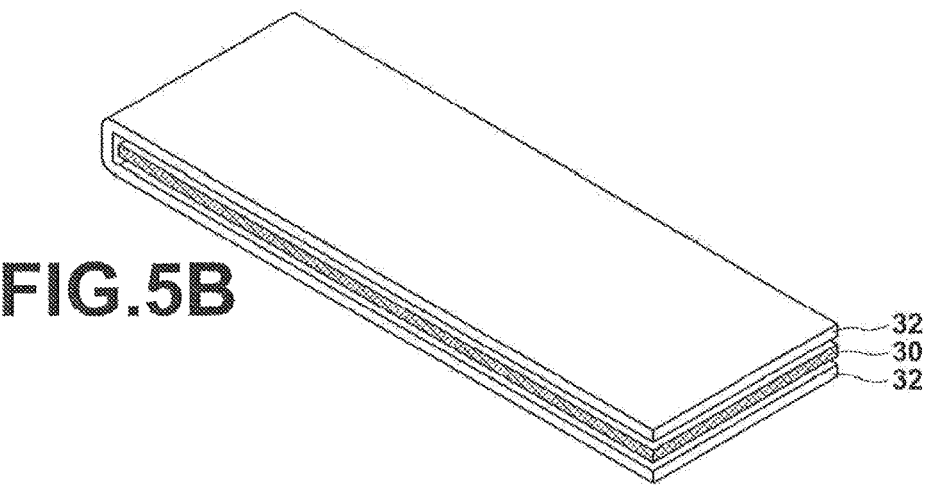
FIG. 5B is a manufacturing process view of the module for acid gas separation, following FIG. 5A.
Figure 5C:
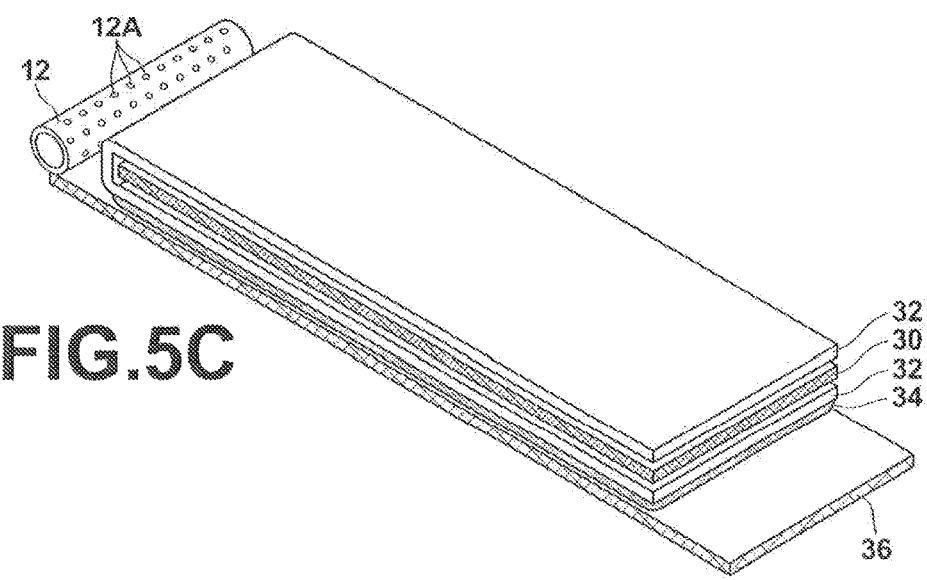
FIG. 5C is a manufacturing process view of the module for acid gas separation, following FIG. 5B.

Next, the method for producing the module for acid gas separation configured as described above will be described. FIG. 5A through FIG. 5C are manufacturing process views of the module for acid gas separation. In the method for producing the module for acid gas separation 10, the tip of the long permeated gas flow path member 36 is first fixed to the wall (outer circumferential surface) of the permeated gas collecting pipe 12 with a fixing member 50 such as Kapton tape or adhesive agents, as illustrated in FIG. 5A. In this case, it is preferable for a slit (not shown) to be provided on the wall along the axial direction. Such a slit receives the tip of the permeated gas flow member 36, and the fixing member 50 fixes the tip to the inner circumferential surface of the permeated gas collecting pipe 12. Such a configuration prevents the permeated gas flow path member 36 from detaching from the slit due to a friction between the inner circumferential surface of the permeated gas collecting pipe 12 and the permeated gas flow path member 36 when the laminated body 14 is wound around the permeated gas collecting pipe 12 with tension being applied thereto. Thus, the permeated gas flow path member 36 can remain fixed to the slit.

Next, as illustrated in FIG. 5B, a long feed gas flow path member 30 is interposed between long acid gas separation membranes 32 created by inwardly folding an acid gas separation layer 32A in two. Note that the acid gas separation membrane 32 may be folded in half when being folded in two or the position of the fold may be shifted.

Next, resin is applied onto both ends in the width direction and one end in the longitudinal direction of one (the surface of the porous support 32B) of the exterior surfaces of the two-folded acid gas separation membrane 32 (resin is applied in the shape of an envelope). Thereby, a sealing portion 34, i.e., a circumferential sealing portion 34A and an axial sealing portion 34B are created.

The resin has a viscosity in a range from 5 to 60 Pa·s, and has a Tg of 90° C. or higher after being cured. The content of the inorganic filling material in the resin is less than or equal to 30% by mass. Employing the resin having such a viscosity enables the resin to be permeated into the pores of the porous support 32B before the resin being cured, thereby forming the sealing portion 34. Accordingly, gas leaks can be suppressed.

The viscosity of the resin is in the range from 5 to 60 Pa·s. When the viscosity of the resin is less than 5 Pa·s, the resin will be likely to pass through the pores of the porous support without staying therein, and the pores, therefore, will not be filled with the resin. As a result, it becomes difficult to suppress gas leaks. Further, when the viscosity of the resin exceeds 60 Pa·s, the resin cannot come into the pores of the porous support, and therefore the pores cannot be filled with the resin. As a result, it becomes difficult to suppress gas leaks as well. In addition, it is more preferable for the viscosity of the resin to be within a range from 10 to 40 Pa·s. Note that the viscosity is measured at a rotational speed 6 rpm by using BIT type viscometer BM2 manufactured by Told Sangyo Ltd. and a probe No. 4, conforming to JIS K7233.

The resin is preferably a two-component mixed resin composed of main agent and a curing agent. Further, the usable time of the resin is preferably within a range from 60 to 240 minutes. In both cases where the usable time is less than 60 minutes and where the usable time exceeds 240 minutes, the workability will deteriorate. Examples of a two-component mixed resin include two-component epoxy resin, two-component modified silicone resin, two-component polyurethane resin, two-component acrylic resin or the like. Among these resin, two-component epoxy resin is preferable from the viewpoint of heat resistance and sealing properties. Examples of two-component mixed resin may suitably include TB2088E and TB2270C made by Three Bond Co., E120HP made by Henkel Corp., NB3000 made by Daizo Inc., 328 made by Shanghai TakeshiJun resin Co., Ltd, and the like, for example. The Tg of the resin and the content of inorganic filling material in the resin are the same as those for the acid gas separation membrane described above, and the descriptions about them will be omitted accordingly.

Next, as illustrated in FIG. 5C, the acid gas separation membranes 32 with the feed gas flow path member 30 interposed therebetween is bonded onto the surface of the permeated gas flow path member 36 fixed to the permeated gas collecting pipe 12 via the sealing portion 34. Note that the acid gas separation membrane 32 is bonded to the permeated gas flow path member 36 such that the axial sealing portion 34B is toward the side opposite the permeated gas collecting pipe 12. Thereby, the sealing portion 34 as a whole, with the circumferential edge between the acid gas separation membrane 32 and the permeated gas flow path member 36 to be wound, becomes open. Further, a flow path P1, through which the acid gas 22 which has permeated through the acid gas separation membrane 32 flows to the open holes 12A, is formed in a space segmented by the circumferential sealing portions 34A and the axial sealing portion 34B.

Next, the resin is applied onto both ends in the width direction and one end in the longitudinal direction of the surface (which is the reverse side of the surface attached to the permeated gas flow path member 36) of the acid gas separation membrane 32 attached to the permeated gas flow path member 36. Thereby, a sealing portion 40, i.e., circumferential sealing portions 40A and an axial sealing portion 40B, are created, thereby forming a laminated body 14.

Then, the laminated body 14 is wound around the permeated gas collecting pipe 12 in the direction of an arrow R as illustrated in FIG. 4 such that the permeated gas flow path member 36 covers the open holes 12 A. In this case, it is preferable for the laminated body 14 to be wound around the permeated gas collecting pipe 12 with tension being applied thereto. Winding the laminated body 14 around the permeated gas collecting pipe 12 in such a manner causes the resin of the sealing portions 34 and 40, especially the sealing portion 40, to easily penetrate into the pores of the porous support 32B, thereby suppressing gas leaks. Further, in order to apply tension to the winding laminated body 14, it is preferable for the tip of the permeated gas flow path member 36 to be fit into and fixed to the slit so as to prevent the permeated gas flow path member 36 from being detached from the slit.

Through the process as described above, a cylindrical wound body is be obtained. Then, a module for acid gas separation 10, in which the outermost circumference of the obtained cylindrical wound body is covered with a coating layer and a telescope prevention plates are provided with both ends of the cylindrical wound body, is obtained as illustrated in FIG. 2.

Hereinafter, the Examples of the module for acid gas separation of the present disclosure will be described in more detail.

EXAMPLE

Preparation of Coating Composition Liquid 1 mol of Hydrochloric acid was added to a solution containing 2.4% by mass of KURASTMER AP20 (manufactured by Kuraray Co., Ltd.) and 0.01% by mass of 25% glutaraldehyde solution (manufactured by Wako Co., Ltd.) until the pH became 1. After crosslinking, 40% cesium carbonate (manufactured by Kisan Kinzoku Chemicals Co., Ltd.) solution was added to the crosslinked solution such that the concentration of cesium carbonate became 3.66% by mass. Then, 40% potassium carbonate (manufactured by Wako Co., Ltd.) solution was added to the solution such that the concentration of potassium carbonate became 0.61% by mass. In addition, 1% RAPISOL A-90 (manufactured by NOF CORPORATION) was added to the solution as an antiblocking agent such that the concentration of 1% RAPISOL A-90 became 0.003% by mass. After increasing the temperature of the solution, an agar aqueous solution which was prepared separately was added thereto to prepare a coating composition liquid.

Example 1

The coating composition liquid prepared as described above was coated on a PTFE porous membrane (thickness: 30 μm) provided with a Polypropylene nonwoven support and was dried. Then, the separation membrane was folded in two with the PTFE porous membrane outward. A net of Polypropylene (wire diameter: 50 μm, openings: 500 μm) was interposed between the two-folded separation membranes as a feed gas flow path member. The resultant unit was coated with epoxy resin TB2088E (manufactured by Three Bond Co., Ltd.) on the porous support side thereof to form an envelope shape (refer to FIG. 4), and then a tricot knit fabric (thickness: 300 μm) made of Polyester was disposed thereon as a permeated gas flow path member. Twenty sets of the obtained laminate were wound around a 50ϕ permeated gas collecting pipe such that the diameter became 200ϕ, thereby creating a spiral module as illustrated in FIG. 2.

Examples 2 and 3; and Comparative Examples 1 through 5

Spiral modules were manufactured in the same manner as in Example 1 except for the type of the resin as shown in Table 1. Note that the details of the resins shown in Table 1 are as described below. Further, note that the amount of inorganic filling material is controlled by adding a predetermined mass of Aerosil R202 (Silica) to the resin.
TB2270C: epoxy resin manufactured by Three Bond Co.,
E120HP: epoxy resin manufactured by Henkel AG & Co. KGaA,
NB3000: epoxy resin manufactured by Daizo Corporation, and
327, 328: epoxy resin manufactured by Shanghai Synthetic Resin Institute of Technology.
(Measurement of Tg)
A rectangle having a width of 10 mm and a length of 50 mm was cut out of a portion coated with resin in the manufactured spiral module, and the upper and lower separation membranes were cut with a file by the thickness of the support to prepare a test sample. The test sample was put on a DMA device (manufactured by Seiko Instruments Inc. DMS6100) to measure the loss modulus under conditions that the distance between chucks is 30 mm, the temperature rising rate is 5° C./min, and the frequency is 1 Hz. The peak temperature of the loss modulus is set as Tg.
(Measurement of Viscosity)
The viscosity of the employed resin was measured at a rotational speed 6 rpm by using BII type viscometer BM2 manufactured by Toki Sangyo Ltd. and a probe No. 4, conforming to HS K7233.

(Measurement of the Content of Inorganic Filling Material)
The upper and lower separation membranes of a portion coated with resin in the manufactured spiral module were cut with a file by the thickness of the support to prepare a test sample. This sample was put on a DG-DTA device (manufactured by Seiko Instruments Inc.) to perform a measurement at a temperature rising rate of 5° C./min. The residual mass % when the temperature rises up to 600° C. is designated as the content of inorganic filling material. This measured content matched the content of inorganic filling material, which had been obtained by adding the predetermined mass % of Aerosil R202 (Silica) to the resin.

<Evaluation>
(Leak Test)
The level of gas leaks was evaluated by measuring the time until the value of a vacuum gauge read −0.09 MPa to −0.08 MPa in the module, when one end of the central pipe was sealed and the other end was connected to a vacuum pump which is sealed by a valve after the interior space of the module is evacuated by the vacuum pump.
(Selectivity)
Mixed gas, in which the mixture ratio of $CO_2$ to $H_2$ is 10:9, was employed as test gas for the manufactured spiral module. This mixed gas is fed into the membrane in an atmosphere of saturated water vapor at a pressure of 2 atm and a temperature of 130° C. The permeated gas was analyzed by a gas chromatograph to calculate $CO_2/H_2$ separation factor (α: the ratio of the permeation amount of $CO_2$ with respect to that of $H_2$). The calculated values were evaluated by the following standards.
A: α is greater than or equal to 80,
B: α is greater than or equal to 40 and less than 80, and
C: α is less than 40.
(Durability)
The mixed gas was fed into the membrane under the same conditions as those for the Selectivity evaluation described above. The selectivity of the mixed gas, which was caused to flow continuously for 1000 hours, was calculated and evaluated based on the following standards.
A: α is greater than or equal to 80,
B: α is greater than or equal to 40 and less than 80, and
C: α is less than 40.
The results are shown with the values of Tg, the viscosity, and the content of the inorganic filling material in Table 1. Note that the mark "-" at the column of the Durability in Table 1 means that the evaluation for the selectivity of gas which was caused to flow for 1000 hours could not be accomplished due to the deterioration of resin.

TABLE 1

| | RESIN | Tg (° C.) | VISCOSITY (Pa · s) | CONTENT OF INORGANIC FILLING MATERIAL (% BY MASS) | AVERAGE PORE DIAMETER OF SUPPORT (μm) | LEAK TEST (SECOND) | SELECTIVITY | DURABILITY AFTER 1000 H |
|---|---|---|---|---|---|---|---|---|
| EXAMPLE 1 | TB2088E | 140 | 33 | 0 | 0.2 | 1922 | A | A |
| EXAMPLE 2 | NB3000 | 150 | 12 | 10 | 0.2 | 1901 | A | A |
| EXAMPLE 3 | NB3000 | 150 | 22 | 30 | 0.2 | 1850 | A | A |
| EXAMPLE 4 | 328 | 93 | 8 | 15 | 0.2 | 1834 | A | A |
| COMPARATIVE EXAMPLE 1 | E120HP | 60 | 34 | 10 | 0.2 | 1911 | B | B |
| COMPARATIVE EXAMPLE 2 | NB3000 | 150 | 4 | 0 | 0.2 | 3 | C | — |

TABLE 1-continued

| | RESIN | Tg (° C.) | VISCOSITY (Pa·s) | CONTENT OF INORGANIC FILLING MATERIAL (% BY MASS) | AVERAGE PORE DIAMETER OF SUPPORT (μm) | LEAK TEST (SECOND) | SELECTIVITY | DURABILITY AFTER 1000 H |
|---|---|---|---|---|---|---|---|---|
| COMPARATIVE EXAMPLE 3 | TB2270C | 123 | 65 | 35 | 0.2 | 183 | C | — |
| COMPARATIVE EXAMPLE 4 | NB3000 | 150 | 30 | 40 | 0.2 | 102 | C | — |
| COMPARATIVE EXAMPLE 5 | NB3000 | 150 | 18 | 10 | 2 | 1874 | A | C |
| COMPARATIVE EXAMPLE 6 | | 327 | 85 | 9 | 15 | 0.2 | 1888 | B | B |

As shown in Table 1, no gas leaks occurred and favorable separation performance and high durability were achieved in the Examples where resin is epoxy resin, the viscosity thereof is in a range of 5 to 60 Pa·s, the resin of the sealing portion has a Tg of 90° C. or higher, and the content of the inorganic filling material is 30% by mass. As shown in Comparative Examples 1 and 6, even if the viscosities of the employed resin are within the range of 5 to 60 Pa·s and the content of the inorganic filling material is 30% by mass or less, gas leaks can be suppressed but the separation performance and durability are poor because the Tg is less than 90° C. Meanwhile, as shown in Comparative Examples 2 and 3, even if the Tg is higher than or equal to 90° C., the pores of the porous support cannot be filled with resin, which cannot suppress the gas leaks and deteriorates the selectivity significantly because the viscosity is low (Comparative Example 2), or the viscosity is high and the content of the inorganic filling material is large (Comparative Example 3). Further, even if the Tg and the viscosity are within the desired ranges, gas leaks cannot be suppressed and the selectivity is significantly deteriorated as in Comparative Example 4 because the content of the inorganic filling material is large. As shown in Comparative Example 5, even if the Tg, the viscosity, and the content of the inorganic filling material are within the desired ranges, the durability deteriorates because the average pore diameter of the porous support is so large that the acid gas separation layer is pushed toward the porous support.

As is evident from the results above, the acid gas separation membrane comprising a porous support, the average pore diameter of which is 0.5 μm or less, and an acid gas separation layer including water-absorbing polymers and acid gas carriers that react with acid gas within a raw material gas can suppress gas leaks and achieve high separation performance and durability even when material gas having a high temperature and is highly humid is employed. This is because in such an acid gas separation membrane, a sealing portion is made of epoxy resin and has a Tg of 90° C., and the content of the inorganic filling material is 30% by mass or less.

What is claimed is:
1. A complex for acid gas separation, comprising:
an acid gas separation membrane including:
   a porous support with pores having an average pore diameter of 0.5 μm or less; and
   an acid gas separation layer disposed on the porous support, the acid gas separation layer including water-absorbing polymers and acid gas carriers that react with acid gas in a raw material gas;
a permeated gas flow path member that allows acid gas, which has reacted with the acid gas carriers and permeated through the acid gas separation layer, to pass therethrough; and
a sealing portion that seals a region on the periphery of the permeated gas flow path member and the porous support with resin, the region being required to be sealed, wherein
the resin is made of epoxy resin,
the Tg of the resin of the sealing portion is 90° C. or higher, and
the content of an inorganic filling material is less than or equal to 30% by mass.

2. A module for acid gas separation, comprising:
an acid gas separation membrane including:
   a porous support with pores having an average pore diameter of 0.5 μm or less; and
   an acid gas separation layer disposed on the porous support, the acid gas separation layer including water-absorbing polymers and acid gas carriers that react with acid gas in a raw material gas;
a permeated gas flow path member that allows acid gas, which has reacted with the acid gas carriers and has permeated through the acid gas separation layer, to pass therethrough;
a sealing portion that seals both ends in the width direction and one end in the longitudinal direction of the porous support and the permeated gas flow path member, with resin;
a feed gas flow path member, into which raw material gas containing the acid gas is fed; and
a permeated gas collecting pipe having open holes on the wall thereof, wherein
the acid gas separation membrane, the permeated gas flow path member, and the feed gas flow path member are wound around the permeated gas collecting pipe,
the resin is made of epoxy resin,
the Tg of the resin in the sealing portion is 90° C. or higher, and
the content of an inorganic filling material is less than or equal to 30% by mass.

3. A method for manufacturing the module for acid gas separation, comprising:
forming an acid gas separation membrane including a porous support and an acid gas separation layer support by providing the acid gas separation layer on the porous support, the acid gas separation layer having water-absorbing polymers and acid gas carriers that react with acid gas in raw material gas,
forming a sealing portion by causing resin to penetrate both ends in the width direction and one end in the longitudinal direction of the porous support and the permeated gas flow path member that allows acid gas, which has reacted with the acid gas carriers and permeated through the acid gas separation layer, to flow therethrough, and winding the acid gas separation membrane, the permeated gas flow path member, and a feed gas flow path member around a permeated gas collecting pipe, the feed gas flow path member being a member into which raw material gas containing the acid gas is fed and the permeated gas collecting pipe having open holes on the wall thereof, wherein the viscosity of the resin is within a range from 5 to 60 Pa·s, the Tg of the resin after being cured is 90° C. or higher, and the content of an inorganic filling material is less than or equal to 30% by mass.

4. The method for manufacturing the module for acid gas separation of claim 3, wherein the resin is epoxy resin.

5. The method for manufacturing the module for acid gas separation of claim 3, wherein the resin is a two-component mixed resin.

6. The method for manufacturing the module for acid gas separation of claim 4, wherein the usable time of the resin is within a range from 60 to 240 minutes.

7. The method for manufacturing the module for acid gas separation of claim 5, wherein the usable time of the resin is within a range from 60 to 240 minutes.

* * * * *